(12) United States Patent
Ohmori

(10) Patent No.: US 11,489,172 B2
(45) Date of Patent: Nov. 1, 2022

(54) FUEL CELL STACK

(71) Applicant: HONDA MOTOR CO., LTD., Tokyo (JP)

(72) Inventor: Suguru Ohmori, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 134 days.

(21) Appl. No.: 17/186,676

(22) Filed: Feb. 26, 2021

(65) Prior Publication Data

US 2021/0280876 A1 Sep. 9, 2021

(30) Foreign Application Priority Data

Mar. 3, 2020 (JP) .............................. JP2020-035494

(51) Int. Cl.
*H01M 8/0247* (2016.01)
*H01M 8/1004* (2016.01)
*H01M 8/2465* (2016.01)
*H01M 8/10* (2016.01)

(52) U.S. Cl.
CPC ....... *H01M 8/0247* (2013.01); *H01M 8/1004* (2013.01); *H01M 8/2465* (2013.01); *H01M 2008/1095* (2013.01)

(58) Field of Classification Search
None
See application file for complete search history.

(56) References Cited

U.S. PATENT DOCUMENTS

| 9,899,688 B2 * | 2/2018 | Toyota | H01M 8/0267 |
| 2005/0214600 A1 * | 9/2005 | Ikezoe | H01M 8/241 |
| | | | 429/432 |
| 2015/0044592 A1 * | 2/2015 | Terada | H01M 8/1004 |
| | | | 429/465 |

FOREIGN PATENT DOCUMENTS

JP 2005-216700 A 8/2005

* cited by examiner

*Primary Examiner* — Alix E Eggerding
(74) *Attorney, Agent, or Firm* — Carrier Blackman & Associates, P.C.; Joseph P. Carrier; William D. Blackman

(57) ABSTRACT

Each of separator members of a fuel cell stack includes a cell voltage terminal protruding outward from an outer peripheral portion of a separator body. Each of the cell voltage terminals includes a plate shaped terminal, first protrusions, and second protrusions. At least some of the cell voltage terminals are arranged in a line in a stacking direction. In the cell voltage terminals facing each other in the stacking direction, the first protrusion of one of the cell voltage terminals and the second protrusion of the other of the cell voltage terminals face each other, and contact each other through an electrically insulating member.

10 Claims, 6 Drawing Sheets

FUEL CELL STACK

CROSS-REFERENCE TO RELATED APPLICATION

This application is based upon and claims the benefit of priority from Japanese Patent Application No. 2020-035494 filed on Mar. 3, 2020, the contents of which are incorporated herein by reference.

BACKGROUND OF THE INVENTION

Field of the Invention

The present invention relates to a fuel cell stack.

Description of the Related Art

A fuel cell stack is formed by stacking membrane electrode assemblies (MEAs) and separator members alternately. Each of the membrane electrode assemblies includes an electrolyte and electrodes provided on both sides of the electrolyte membrane. Each of the separator members includes a gas voltage terminal for detecting the cell voltage during power generation. For example, Japanese Laid-Open Patent Publication No. 2005-216700 discloses a cell voltage terminal protruding outward from an outer peripheral portion of a separator body forming a separator member.

SUMMARY OF THE INVENTION

In the conventional technique, in a stacking direction in which MEAs and separator members are stacked together, a plurality of cell voltage terminals are spaced from each other. That is, the cell voltage terminals are supported only by the separator body. In this case, since the plate thickness of the separator body is thin, the plurality of cell voltage terminals tilt easily in the stacking direction.

The present invention has been made taking such a problem into account, and an object of the present invention is to provide a fuel cell stack which makes it possible to suppress tilt of the cell voltage terminals in the stacking direction.

According to an aspect of the present invention, a fuel cell stack is provided. The fuel cell stack includes a plurality of membrane electrode assemblies and a plurality of separator members, the membrane electrode assemblies each including an electrolyte membrane, and electrodes provided on both sides of the electrolyte membrane, the membrane electrode assemblies and the separator members being stacked together alternately, wherein each of the separator members includes a separator body stacked on the membrane electrode assembly, and a cell voltage terminal protruding outward from an outer peripheral portion of the separator body, the cell voltage terminal each includes a plate shaped terminal, a first protrusion protruding from the terminal toward one side in a stacking direction in which the membrane electrode assembly and the separator member are stacked together, and a second protrusion protruding from the terminal toward another side of in the stacking direction, and wherein at least some of the cell voltage terminals are arranged in a line in the stacking direction, and in the cell voltage terminals facing each other in the stacking direction, the first protrusion of one of the cell voltage terminals and the second protrusion of another of the cell voltage terminals face each other, and contact each other through an electrically insulating member.

According to the present invention, in a cell voltage terminals which face each other in the stacking direction, the first protrusion of one of the cell voltage terminals and the second protrusion of the other of the cell voltage terminals face each other, and contact each other through the insulting member. As a result, it is possible to support the cell voltage terminals, by the cell voltage terminals which face each other in the stacking direction. Accordingly, it is possible to suppress tilt of the cell voltage terminals in the stacking direction.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Hereinafter, a preferred embodiment of a fuel cell stack according to the present invention will be described with reference to the accompanying drawings.

Figure 1:
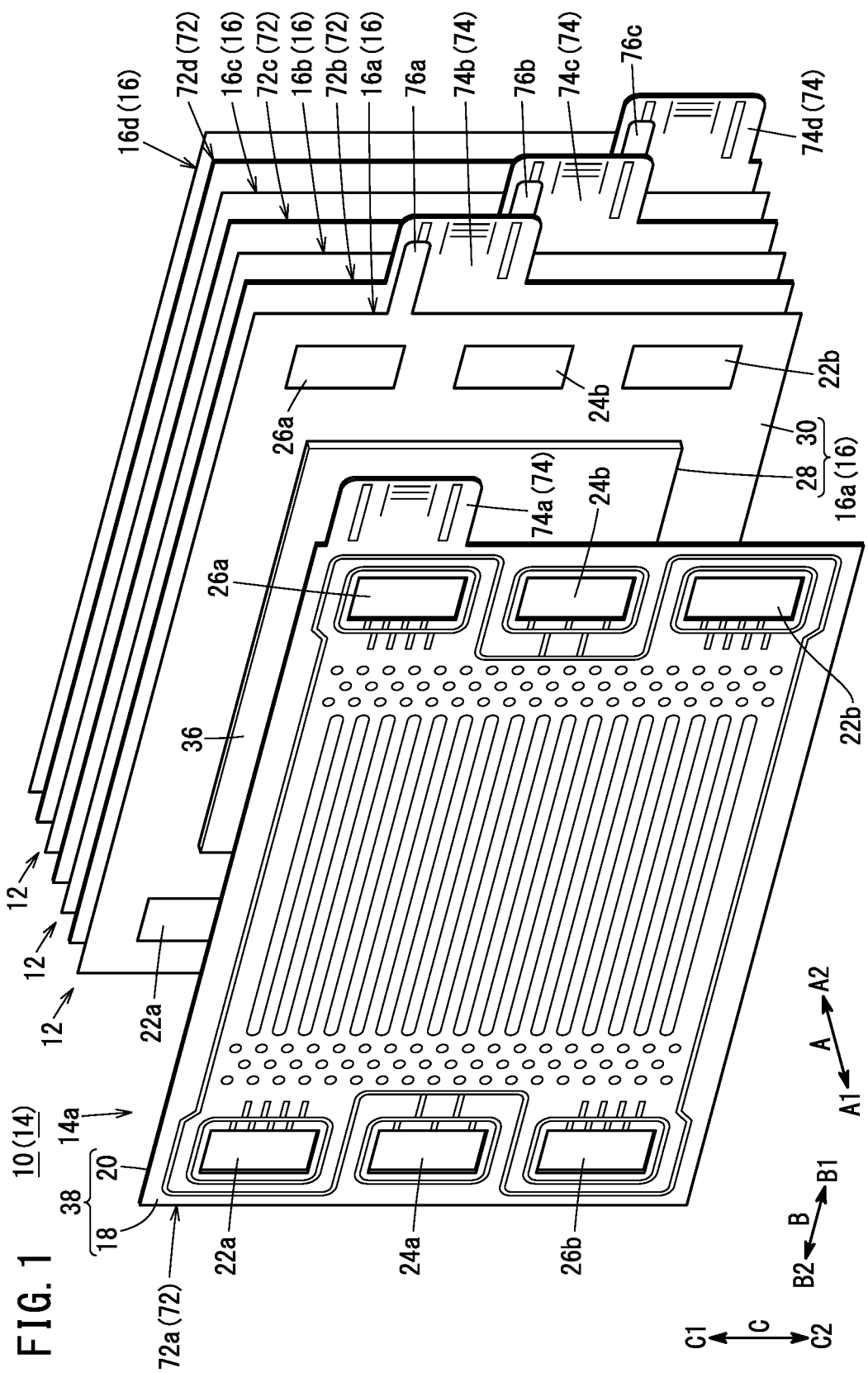
FIG. 1 is a partial exploded perspective view showing a fuel cell stack according to an embodiment of the present invention.

As shown in FIG. 1, a fuel cell stack 10 according to the embodiment of the present invention includes a stack body 14 formed by stacking a plurality of power generation cells 12. For example, the fuel cell stack 10 is mounted in a fuel cell automobile. It should be noted that the fuel cell stack 10 may be used in stationary applications.

At both ends of the stack body 14 in the stacking direction (in the direction indicated by an arrow A), end plates (not shown) are provided. These end plates are coupled together using coupling members (not shown) to apply a tightening load (compression load) in the stacking direction to the stack body 14.

Figure 2:
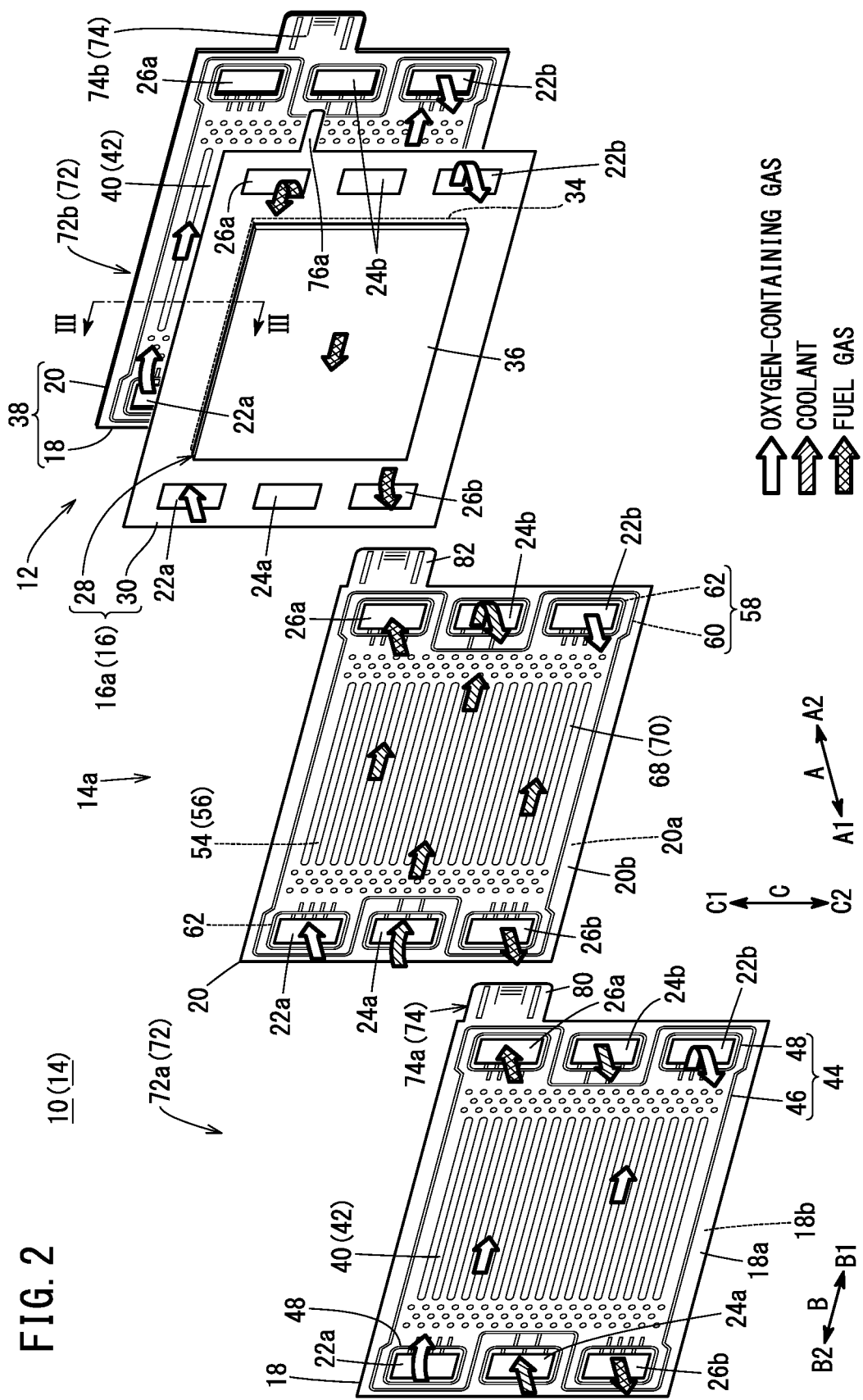
FIG. 2 is an exploded perspective view illustrating a power generation cell in FIG. 1.

In FIG. 2, the power generation cell 12 includes a resin frame equipped membrane electrode assembly (hereinafter referred to as a "resin frame equipped MEA 16"), and a first separator 18 and a second separator 20 sandwiching and holding the resin frame equipped MEA 16.

At one end of the power generation cell 12 in the long side direction indicated by an arrow B (end in the direction indicated by an arrow B2), an oxygen-containing gas supply passage 22a, a coolant supply passage 24a, and a fuel gas discharge passage 26b are arranged in the short side direction of the power generation cell 12 indicated by an arrow C. The oxygen-containing gas supply passage 22a and the fuel gas discharge passage 26b are formed in each of the power generation cells 12. The oxygen-containing gas supply passage 22a extends through the power generation cells 12 in the stacking direction (indicated by the arrow A), for supplying an oxygen-containing gas. The coolant supply passage 24a extends through each of the power generation cells 12 in the direction indicated by the arrow A, for supplying the coolant (e.g., pure water, ethylene glycol, oil). The fuel gas discharge passage 26b extends through each of the power generation cells 12 in the direction indicated by the arrow A, for discharging the fuel gas (e.g., the hydrogen-containing gas).

At the other end of the power generation cell 12 in a direction indicated by the arrow B (end in the direction indicated by an arrow B1), a fuel gas supply passage 26a, a coolant discharge passage 24b, and an oxygen-containing gas discharge passage 22b are arranged in the direction indicated by the arrow C. The fuel gas supply passage 26a extends through each of the power generation cells 12 in the direction indicated by the arrow A, for supplying the fuel gas. The coolant discharge passage 24b extends through each of the power generation cells 12 in the direction indicated by the arrow A, for discharging the coolant. The oxygen-containing gas discharge passage 22b extends through each of the power generation cells 12, for discharging the oxygen-containing gas.

The sizes, the positions, the shapes, and the numbers of the oxygen-containing gas supply passage 22a, the oxygen-containing gas discharge passage 22b, the fuel gas supply passage 26a, the fuel gas discharge passages 26b, the coolant supply passage 24a, and the coolant discharge passage 24b are not limited to the embodiment of the present invention (example of FIG. 2), and may be determined as necessary depending on the required specification.

Figure 3:
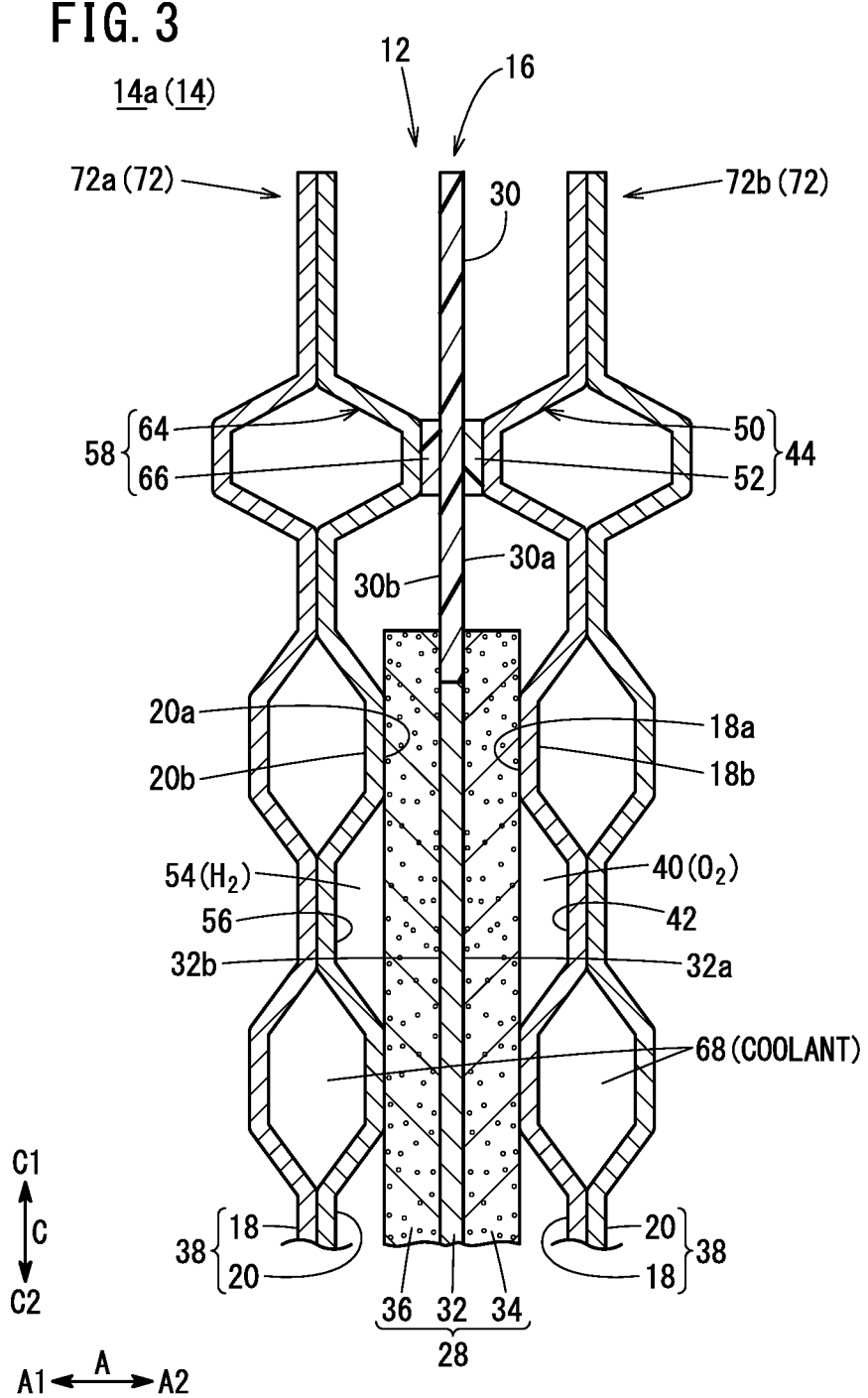
FIG. 3 is a cross sectional view taken along a line III-III in FIG. 2.

As shown in FIGS. 2 and 3, the resin frame equipped MEA 16 includes a membrane electrode assembly (hereinafter referred to as am "MEA 28"), and a resin frame member 30 (resin frame part, resin film). The resin frame member 30 includes an overlap portion joined to an outer peripheral portion of the MEA 28, and the resin frame member 30 is provided around the outer peripheral portion of the MEA 28. In FIG. 3, the MEA 28 includes an electrolyte membrane 32, a cathode 34 provided on one surface 32a of the electrolyte membrane 32, and an anode 36 provided on another surface 32b of the electrolyte membrane 32.

For example, the electrolyte membrane 32 is a solid polymer electrolyte membrane (cation ion exchange membrane). For example, the sold polymer electrolyte membrane is a thin membrane of perfluorosulfonic acid containing water. A fluorine based electrolyte may be used as the electrolyte membrane 32. Alternatively, an HC (hydrocarbon) based electrolyte may be used as the electrolyte membrane 32. The electrolyte membrane 32 is held between the cathode 34 and the anode 36.

Though not shown in details, the cathode 34 includes a first electrode catalyst layer joined to one surface 32a of the electrolyte membrane 32, and a first gas diffusion layer stacked on the first electrode catalyst layer. The first electrode catalyst layer is formed by depositing porous carbon particles uniformly on the surface of the first gas diffusion layer, and platinum alloy is supported on surfaces of the carbon particles.

The anode 36 includes a second electrode catalyst layer joined to the other surface 32b of the electrolyte membrane 32, and a second gas diffusion layer stacked on the second electrode catalyst layer. The second electrode catalyst layer is formed by depositing porous carbon particles uniformly on the surface of the second gas diffusion layer, and platinum alloy is supported on surfaces of the carbon particles.

Each of the first gas diffusion layer and the second gas diffusion layer comprises a carbon paper, a carbon cloth, etc.

The surface size of the electrolyte membrane 32 is smaller than the surface sizes of the cathode 34 and the anode 36. The outer marginal portion of the cathode 34 and the outer marginal portion of the anode 36 hold the inner marginal portion of the resin frame member 30. The resin frame member 30 has non-impermeable structure where the reactant gases (the oxygen-containing gas and the fuel gas) do not pass through the resin frame member 30. The resin frame member 30 is provided on the outer peripheral side of the MEA 28.

The resin frame equipped MEA 16 may not use the resin frame member 30, and may use the electrolyte membrane 32 which protrudes outward. Further, the resin frame equipped MEA 16 may be formed by providing frame shaped films on both sides of the electrolyte membrane 32 which protrudes outward.

In FIGS. 2 and 3, each of the first separator 18 and the second separator 20 is made of metal, and has a rectangular shape (quadrangular shape). Each of the first separator 18 and the second separator 20 is formed by press forming of a steel plate, a stainless steel plate, an aluminum plate, a plated steel plate, or a steel thin plate or a metal thin plate having an anti-corrosive surface by surface treatment to have a corrugated shape in cross section. The thickness of the metal thin plate is in the range between about 0.05 mm and 0.20 mm.

In the state where the first separator 18 and the second separator 20 are overlapped with each other, outer peripheral portions of the first separator 18 and the second separator 20 are joined together by welding, brazing, crimping, etc. integrally to form a separator body 38 (joint separator). The separator body 38 forms a separator member 72 described later.

The first separator 18 has an oxygen-containing gas flow field 40 on its surface 18a facing the MEA 28. The oxygen-containing gas flow field 40 is connected to the oxygen-containing gas supply passage 22a and the oxygen-containing gas discharge passage 22b. The oxygen-containing gas flow field 40 includes a plurality of oxygen-containing gas flow grooves 42 extending straight in the direction indicated by the arrow B. Each of the oxygen-containing gas flow grooves 42 may extend in a wavy pattern in the direction indicated by the arrow B.

A first seal 44 is provided on the first separator 18, for preventing leakage of fluid (the oxygen-containing gas, the fuel gas, and the coolant) from a position between the resin frame equipped MEA 16 and the first separator 18. In FIG. 2, the first seal 44 includes a first outer seal 46 formed along the outer peripheral portion of the first separator 18, and a plurality of first passage seals 48 formed around each of the fluid passages (oxygen-containing gas supply passage 22a, etc.). The first seal 44 extends straight as viewed in the separator thickness direction (indicated by the arrow A). It should be noted that the first seal 44 may extend in a wavy pattern as viewed in the separator thickness direction.

In FIG. 3, the first seal 44 includes a first metal bead 50 formed integrally with the first separator 18, and a first resin member 52 provided on the first metal bead 50. The first metal bead 50 protrudes from the first separator 18 toward the resin frame member 30. The first metal bead 50 has a trapezoidal shape in lateral cross section which is tapered (narrowed) in a protruding direction in which the first metal bead 50 protrudes. The first resin member 52 is an elastic member fixed to the protruding end surface of the first metal bead 50 by printing or coating, etc. For example, polyester fiber may be used as the first resin member 52.

As shown in FIGS. 2 and 3, the second separator 20 has a fuel gas flow field 54 on its surface 20a facing the MEA 28. The fuel gas flow field 54 is connected to the fuel gas supply passage 26a and the fuel gas discharge passage 26b. The fuel gas flow field 54 includes a plurality of fuel gas flow grooves 56 extending in the direction indicated by the arrow B. Each of the fuel gas flow grooves 56 may extend in a wavy pattern in the direction indicated by the arrow B.

A second seal 58 is provided on the second separator 20, for preventing leakage of the fluid (the oxygen-containing gas, the fuel gas, and the coolant) to the outside from a position between the resin frame equipped MEA 16 and the second separator 20. In FIG. 2, the second seal 58 includes a second outer seal 60 formed along the outer peripheral portion of the second separator 20, and a plurality of second passage seals 62 formed around the fluid passages (e.g., oxygen-containing gas supply passage 22a), respectively. The second seal 58 extends straight as viewed in the separator thickness direction (indicated by the arrow A). Alternatively, the second seal 58 may extend in a wavy pattern as viewed in the separator thickness direction.

In FIG. 3, the second seal 58 includes a second metal bead 64 formed integrally with the second separator 20, and a second resin member 66 provided on the second metal bead 64. The second metal bead 64 protrudes from the second separator 20 toward the resin frame member 30. The second metal bead 64 has a trapezoidal shape in lateral cross section which is tapered (narrowed) in a protruding direction in which the second metal bead 64 protrudes. The second resin member 66 may be made of resin material having elasticity fixed to the protruding end surface of the second metal bead 64 by printing or coating, etc. For example, polyester fiber may be used as the second resin member 66.

The first resin member 52 may be provided on one surface 30a of the resin frame member 30 instead of the first metal bead 50. The second resin member 66 may be provided on another surface 30b of the resin frame member 30 instead of the second metal bead 64. Further, at least one of the first resin member 52 and the second resin member 66 may be dispensed with. The first seal 44 and the second seal 58 may be elastic rubber members instead of metal bead seals.

In FIGS. 2 and 3, a coolant flow field 68 is provided between a surface 18b of the first separator 18 and a surface 20b of the second separator 20. The coolant flow field 68 is connected to the coolant supply passage 24a and the coolant discharge passage 24b. The coolant flow field 68 is formed on the back surface of the oxygen-containing gas flow field 40 and the back surface of the fuel gas flow field 54. The coolant flow field 68 includes a plurality of coolant flow grooves 70 extending straight in the direction indicated by the arrow B. The coolant flow grooves 70 may extend in a wavy pattern in the direction indicated by the arrow B.

As shown in FIG. 1, the stack body 14 of the fuel cell stack 10 is formed by stacking the resin frame equipped MEAs 16 and the separator members 72 alternately.

The separator member 72 includes a metal separator body 38, and a cell voltage terminal 74 protruding outward from an outer peripheral portion of the separator body 38. As described above, the separator body 38 is stacked on the resin frame equipped MEA 16. The cell voltage terminal 74 is used for detecting the voltage (cell voltage) during power generation of the power generation cells 12. The cell voltage terminal 74 protrudes outward (in the direction indicated by the arrow B1) from an outer peripheral portion of the separator body 38 (end in the direction indicated by the arrow B1).

The fuel cell stack 10 includes four types of separator members 72 having cell voltage terminals 74, respectively, at different positions. Hereafter, the four types of separator member 72 are also referred to as the first separator member 72a, a second separator member 72b, a third separator member 72c, and a fourth separator member 72d.

Figure 4:
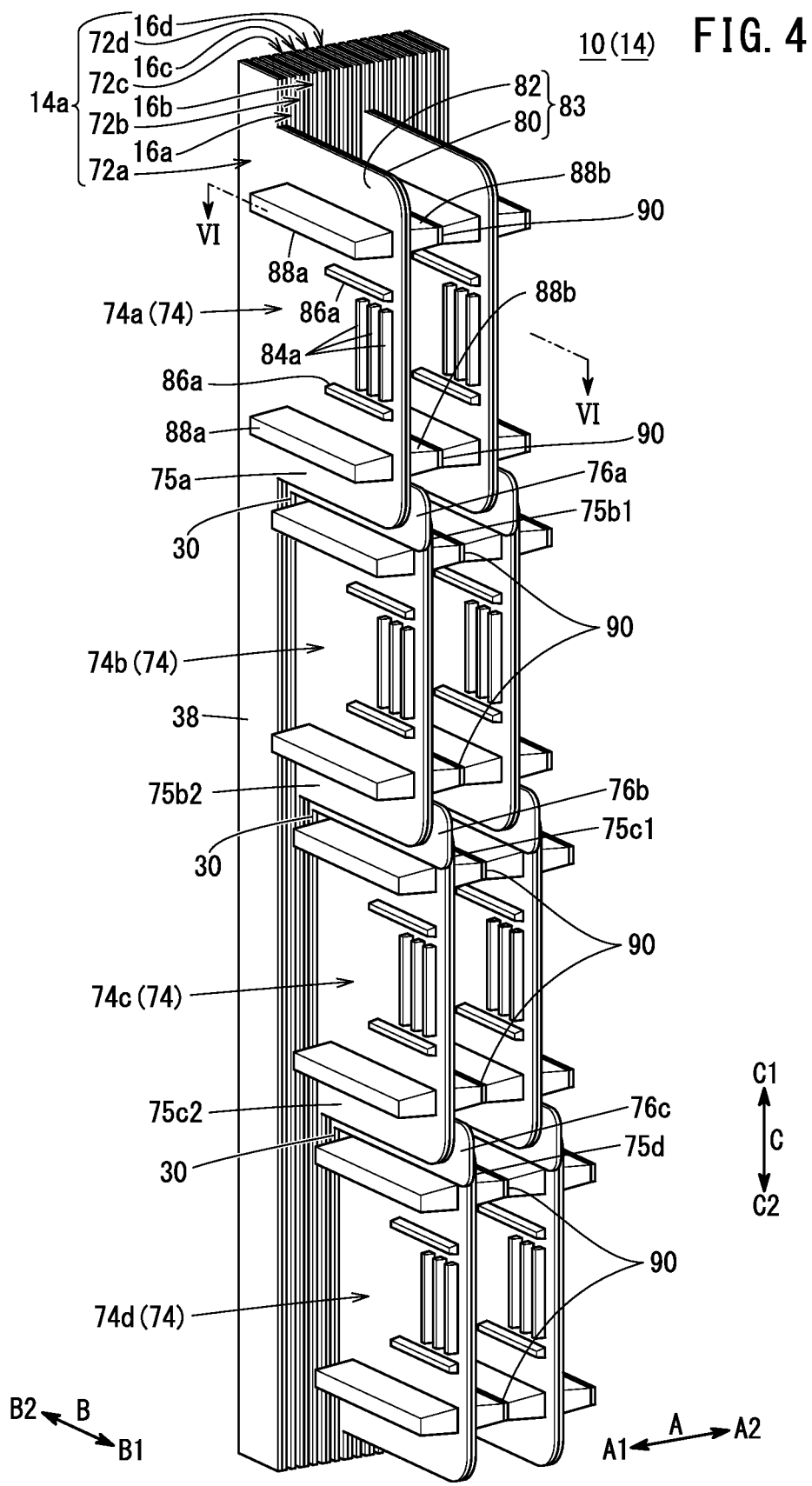
FIG. 4 is a perspective view showing a cell voltage terminal.
Figure 5:
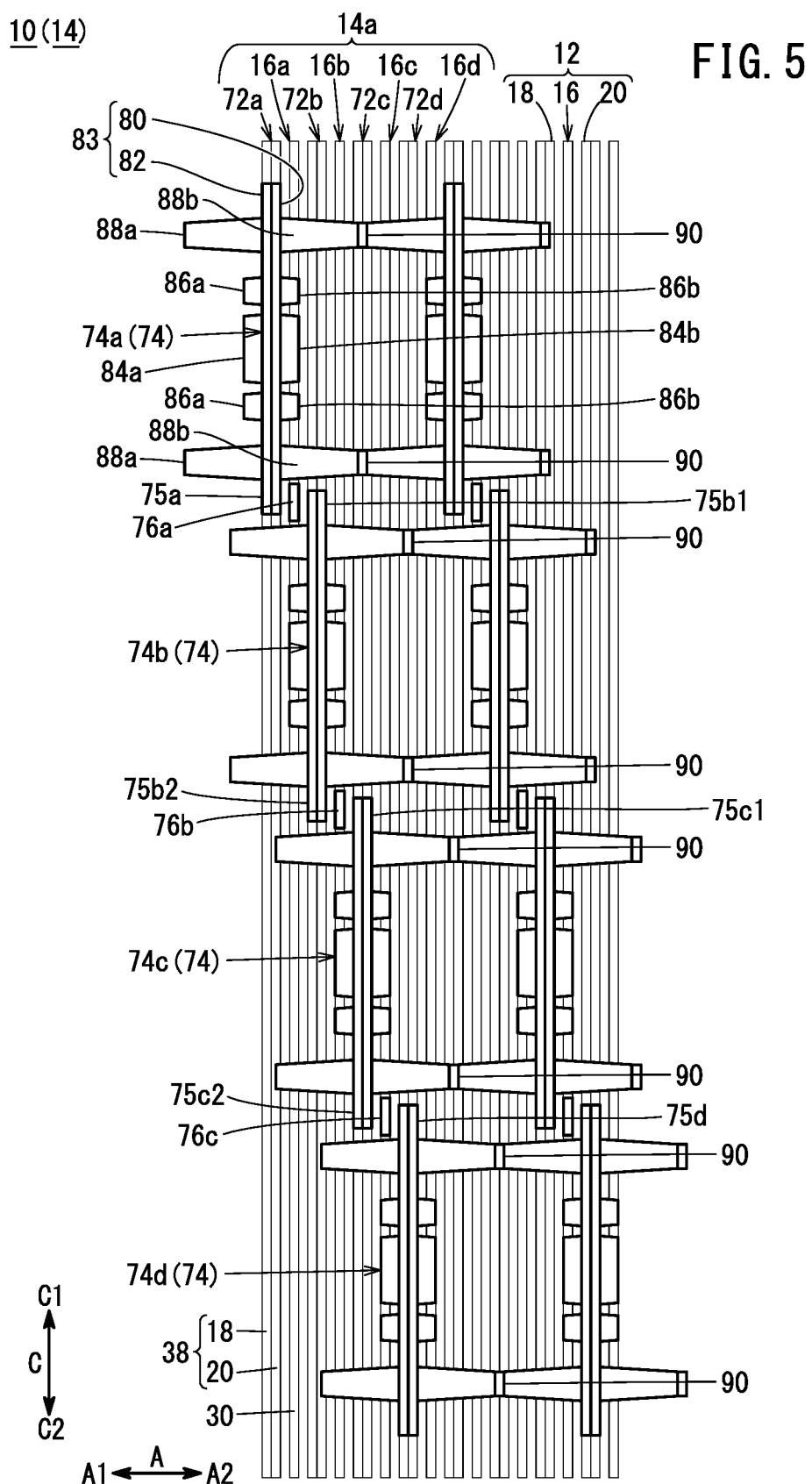
FIG. 5 is a plan view showing the cell voltage terminal in FIG. 4, as viewed from a direction indicated by an arrow B1.

As shown in FIGS. 4 and 5, the cell voltage terminal 74 of the first separator member 72a (hereinafter also referred to as a "first cell voltage terminal 74a") is provided at one end of the separator body 38 in the direction indicated by the arrow C (end of the separator body 38 in the direction indicated by the arrow C1). The second separator member 72b is positioned opposite to the first separator member 72a through the resin frame equipped MEA 16 (hereinafter also referred to as a "first resin frame equipped MEA 16a"). Stated otherwise, the first separator member 72a and the second separator member 72b are provided on both sides of the first resin frame equipped MEA 16a to hold it.

The position of the cell voltage terminal 74 (hereinafter also referred to as a "second cell voltage terminal 74b") of the second separator member 72b is shifted from the position of the first cell voltage terminal 74a toward the other end of the separator body 38 in the direction indicated by the arrow C (in the direction indicated by the arrow C2). As viewed in the direction indicated by the arrow A, the end of the second cell voltage terminal 74b in the direction indicated by the arrow C1 is overlapped with the end of the first cell voltage terminal 74a in the direction indicated by the arrow C2. That is, as viewed in the stacking direction (direction indicated by the arrow A), the first cell voltage terminal 74a and the second cell voltage terminal 74b include overlap portions 75a, 75b1 overlapped with each other.

The first resin frame equipped MEA 16a is provided with a first terminal insulating portion 76a for preventing the first cell voltage terminal 74a and the second cell voltage terminal 74b from being electrically connected together. The first terminal insulating portion 76a protrudes in the direction indicated by the arrow B1, from the end of the resin frame member 30 of the first resin frame equipped MEA 16a in the direction indicated by the arrow B1. The first terminal insulating portion 76a is positioned between the overlap portion 75a of the first cell voltage terminal 74a and the overlap portion 75b1 of the second cell voltage terminal 74b. The first terminal insulating portion 76a protrudes in the direction indicated by the arrow B1 beyond the first cell voltage terminal 74a and the second cell voltage terminal 74b.

The third separator member 72c is positioned opposite to the second separator member 72b through the resin frame equipped MEA 16 (hereinafter also referred to as a "second resin frame equipped MEA 16b"). Stated otherwise, the second separator member 72b and the third separator member 72c are provided on both sides of the second resin frame equipped MEA 16b to hold it.

The position of the cell voltage terminal 74 (hereinafter also referred to as a "third cell voltage terminal 74c") of the third separator member 72c is shifted from the position of the second cell voltage terminal 74b in the direction indicated by the arrow C2. As viewed in the direction indicated by the arrow A, the end of the third cell voltage terminal 74c in the direction indicated by the arrow C1 is overlapped with the end of the second cell voltage terminal 74b in the direction indicated by the arrow C2. That is, the second cell voltage terminal 74b and the third cell voltage terminal 74c include overlap portions 75b2, 75c1 overlapped with each other as viewed in the stacking direction (direction indicated by the arrow A).

The second resin frame equipped MEA 16b is provided with a second terminal insulating portion 76b for preventing the second cell voltage terminal 74b and the third cell voltage terminal 74c from being electrically connected together. The second terminal insulating portion 76b protrudes in the direction indicated by the arrow B1, from the end of the resin frame member 30 of the second resin frame equipped MEA 16b in the direction indicated by the arrow B1. The second terminal insulating portion 76b is positioned between the overlap portion 75b2 of the second cell voltage terminal 74b and the overlap portion 75c1 of the third cell voltage terminal 74c. The second terminal insulating portion 76b protrudes in the direction indicated by the arrow B1 beyond the second cell voltage terminal 74b and the third cell voltage terminal 74c.

The fourth separator member 72d is positioned on a side opposite to the third separator member 72c through the resin frame equipped MEA 16 (hereinafter also referred to as a "third resin frame equipped MEA 16c"). Stated otherwise, the third resin frame equipped MEA 16c is sandwiched and held between the third separator member 72c and the fourth separator member 72d.

The position of the cell voltage terminal 74 (hereinafter also referred to as a "fourth cell voltage terminal 74d") of the fourth separator member 72d is shifted from the position of the third cell voltage terminal 74c in the direction indicated by the arrow C2. As viewed in the direction indicated by the arrow A, the end of the fourth cell voltage terminal 74d in the direction indicated by the arrow C1 is overlapped with the end of the third cell voltage terminal 74c in the direction indicated by the arrow C2. That is, the third cell voltage terminal 74c and the fourth cell voltage terminal 74d include overlap portions 75c2, 75d overlapped with each other, as viewed in the stacking direction (direction indicated by the arrow A).

The third resin frame equipped MEA 16c is provided with a third terminal insulating portion 76c for preventing the third cell voltage terminal 74c and the fourth cell voltage terminal 74d from being electrically connected together. The third terminal insulating portion 76c protrudes in the direction indicated by the arrow B1, from the end of the resin frame member 30 of the third resin frame equipped MEA 16c in the direction indicated by the arrow B1. The third terminal insulating portion 76c is positioned between the overlap portion 75c2 of the third cell voltage terminal 74c and the overlap portion 75d of the fourth cell voltage terminal 74d. The third terminal insulating portion 76c protrudes in the direction indicated by the arrow B1 beyond the third cell voltage terminal 74c and the fourth cell voltage terminal 74d.

The first separator member 72a is positioned opposite to the fourth separator member 72d through the resin frame equipped MEA 16 (hereinafter also referred to as a "fourth resin frame equipped MEA 16d"). Stated otherwise, the fourth separator member 72d and the first separator member 72a are provided on both sides of the fourth resin frame equipped MEA 16d to hold it. No terminal insulating portion is provided for the fourth resin frame equipped MEA 16d.

As described above, the first separator member 72a, the first resin frame equipped MEA 16a, the second separator member 72b, the second resin frame equipped MEA 16b, the third separator member 72c, the third resin frame equipped MEA 16c, the fourth separator member 72d, and the fourth resin frame equipped MEA 16d are stacked together in this order to form a unit stack part 14a. That is, the stack body 14 is formed by stacking a plurality of unit stack parts 14a.

In FIGS. 4 and 5, the first cell voltage terminal 74a, the second cell voltage terminal 74b, the third cell voltage terminal 74c, and the fourth cell voltage terminal 74d have common structure. Specifically, the cell voltage terminal 74 includes a first terminal 80 provided for the first separator 18, and a second terminal 82 provided for the second separator 20. Each of the first terminal 80 and the second terminal 82 has a quadrangular shape. The first terminal 80 and the second terminal 82 contact each other, or positioned close to each other in the stacking direction (indicated by the arrow A).

The first terminal 80 is provided integrally with the first separator 18 by press forming. It should be noted that the first terminal 80 and the first separator 18 may be formed as separate members, and thereafter, the first terminal 80 may be joined to the first separator 18.

Three first ridges 84a, two first ribs 86a, and two first protrusions 88a are formed integrally with the first terminal 80 by press forming. Each of the three first ridges 84a, the two first ribs 86a, and the two first protrusions 88a protrudes from the first terminal 80 toward one side in the stacking direction (in the direction indicated by the arrow A1). Stated otherwise, each of the three first ridges 84a, the two first ribs 86a, and the two first protrusions 88a protrudes in a direction opposite to the mating surfaces (contact surfaces) of the first terminal 80 and the second terminal 82. In the structure, the rigidity of the first terminal 80 is improved.

The three first ridges 84a are provided at the central portion of the first terminal 80 in the width direction (direction indicated by the arrow C). The three first ridges 84a are arranged in the state where the first ridges 84a are spaced from each other in a protruding direction in which the first terminal 80 protrudes from the first separator 18 (in the direction indicated by the arrow B). The three first ridges 84a are positioned at the protruding end of the first terminal 80. The three first ridges 84a extend in parallel to each other in the direction indicated by the arrow C.

The two first ribs 86a are provided on both sides of the three first ridges 84a in the direction indicated arrow C. The two first ribs 86a extend in parallel to each other in the direction indicated by the arrow B. Each of the first ribs 86a protrudes from the protruding end of the first terminal 80 (end in the direction indicated by the arrow B1) to the central part of the first terminal 80 in the direction indicated by the arrow B.

Two first protrusions 88a are provided on both sides of two first ribs 86a in the direction indicted by the arrow C. The two first protrusions 88a are provided at both ends of the first terminal 80 in the width direction. The two first protrusions 88a extend in parallel to each other in the direction indicated by the arrow B. Each of the first protrusions 88a extends from the protruding end of the first terminal 80 (end in the direction indicated by the arrow B1) to the root of the first terminal 80 (adjacent to the border between the first terminal 80 and the first separator 18).

Each of the first protrusions 88a has a trapezoidal shape in lateral cross section which is tapered (narrowed) in a protruding direction in which the first protrusions 88a protrudes. The protruding length of each of the first protrusions 88a (length in the direction indicated by the arrow A) is longer than the protruding length of each of the first ribs 86a (length in the direction indicated by the arrow A). The protruding end surface of each of the first protrusions 88a has a flat shape. It should be noted that, for example, the protruding end surface of each of the first protrusions 88a may be a circular arc shaped curved surface.

The second terminal 82 is provided integrally with the second separator 20 by press forming. It should be noted that after the second terminal 82 and the second separator 20 are formed as separate members, the second terminal 82 may be joined to the second separator 20. The shape and the size of the second terminal 82 are the same as the shape and the size of the first terminal 80. The first terminal 80 and the second terminal 82 contact each other, or are positioned close to each other to form a plate shaped terminal 83.

Three second ridges 84b, two second ribs 86b, and two second protrusions 88b are formed integrally with the second terminal 82 by press forming. Each of the three second ridges 84b, the two second ribs 86b, and the two second protrusions 88b protrude from the second terminal 82 toward the other side in the stacking direction (direction indicated by the arrow A2). Stated otherwise, the three second ridges 84b, the two second ribs 86b, and the two second protrusions 88b protrude in a direction opposite to the mating surfaces (contact surfaces) of the first terminal 80 and the second terminal 82. In the structure, the rigidity of the second terminal 82 is improved.

The three second ridges 84b are provided at the central portion of the second terminal 82 in the width direction (direction indicated by the arrow C). The three second ridges 84b are arranged in the state where the second ridges 84b are spaced from each other in a protruding direction in which the second terminal 82 protrudes from the second separator 20 (direction indicated by the arrow B). The three second ridges 84b are positioned at the protruding end of the second terminal 82. The three second ridges 84b extend in parallel to each other in the direction indicated by the arrow C. As viewed in the direction indicated by the arrow A, the three second ridges 84b are overlapped with the three first ridges 84a, respectively.

The two second ribs 86b are provided on both sides of the three second ridges 84b in the direction indicated arrow C. The two second ribs 86b extend in parallel to each other in the direction indicated by the arrow B. Each of the second ribs 86b protrudes from the protruding end of the second terminal 82 (end in the direction indicated by the arrow B1) to the central part of the second terminal 82 in the direction indicated by the arrow B. As viewed in the direction indicated by the arrow A, the two second ribs 86b are overlapped with the two first ribs 86a, respectively.

Two second protrusions 88b are provided on both sides of two second ribs 86b from the direction indicted by the arrow C. The two second protrusions 88b are provided at both ends of the second terminal 82 in the width direction. The two second protrusions 88b extend in parallel to each other in the direction indicated by the arrow B. Each of the second protrusions 88b extends from the protruding end of the second terminal 82 (end in the direction indicated by the arrow B1) to the root of the second terminal 82 (adjacent to the border between the second terminal 82 and the second separator 20).

Each of the second protrusions 88b has a trapezoidal shape in lateral cross section which is tapered (narrowed) in a protruding direction in which the second protrusions 88b protrude. The protruding length of each of the second protrusions 88b (length in the direction indicated by the arrow A) is longer than the protruding length of each of the second ribs 86b (length in the direction indicated by the arrow A). The protruding length of each of the second protrusions 88b is the same as the protruding length of each of the first protrusions 88a. The protruding end surface of each of the second protrusions 88b has a flat shape. It should be noted that the protruding end surface of each of the second protrusions 88b may have, e.g., a circular curved shape. As viewed in the direction indicated by the arrow A, the two second protrusions 88b are overlapped with the two first protrusions 88a, respectively.

The plurality of first cell voltage terminals 74a are arranged in a line in the direction indicated by the arrow A. The plurality of second cell voltage terminals 74b are arranged in a line in the direction indicated by the arrow A. The plurality of third cell voltage terminals 74c are arranged in a line in the direction indicated by the arrow A. The plurality of fourth cell voltage terminals 74d are arranged in a line in the direction indicated by the arrow A.

Figure 6:
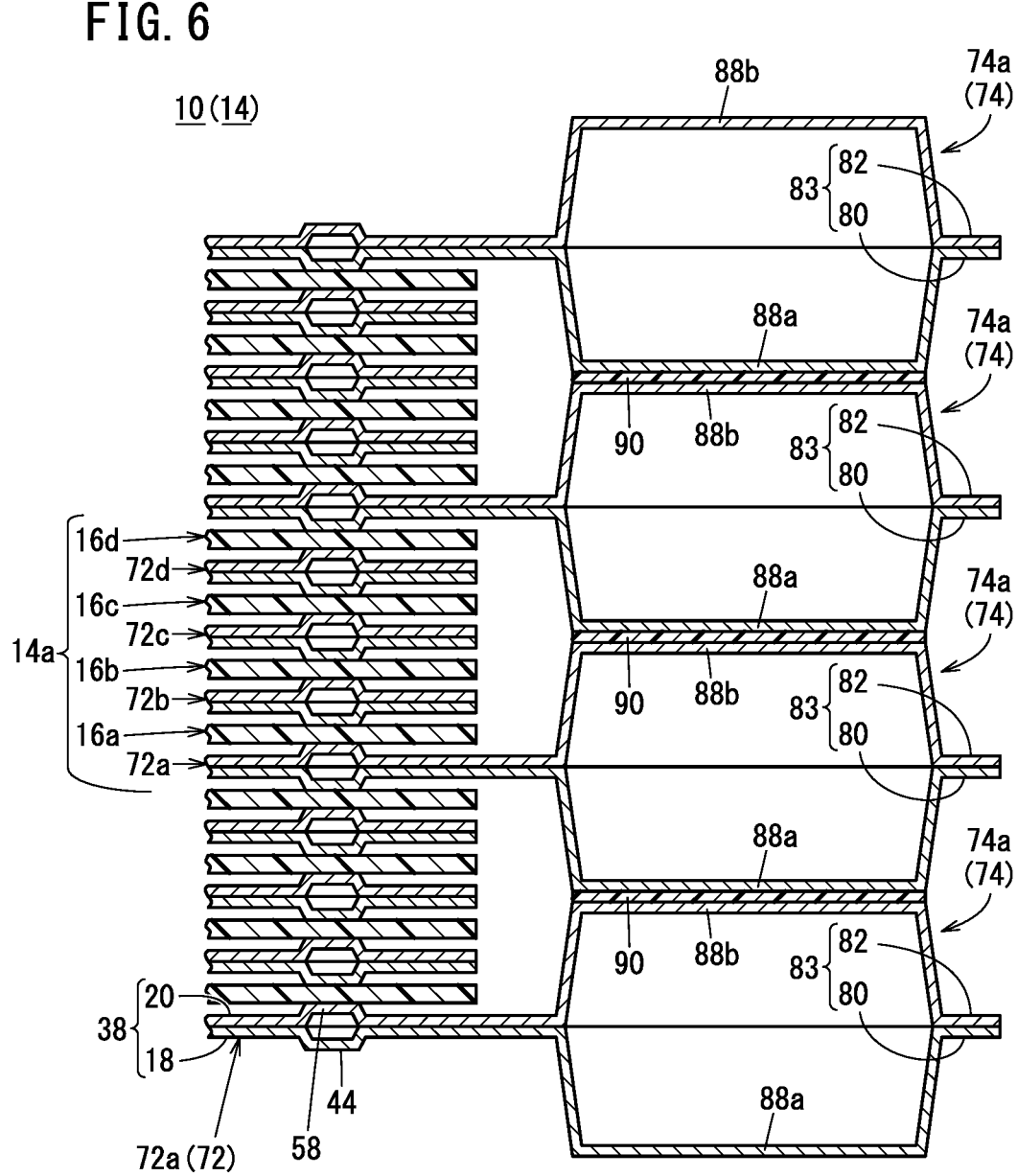
FIG. 6 is a cross sectional view taken along a line VI-VI in FIG. 4.

In the cell voltage terminals 74 facing each other in the direction indicated by the arrow A, the first protrusions 88a and the second protrusions 88b are positioned to overlap each other in the direction indicated by the arrow A. As shown in FIGS. 4 to 6, in the cell voltage terminals 74 facing each other in the direction indicated by the arrow A, the first protrusion 88a of one of the cell voltage terminals 74 and the second protrusion 88b of the other of the cell voltage terminals 74 face each other, and contact each other through an electrically insulating member 90.

Stated otherwise, in the first cell voltage terminals 74a facing each other in the direction indicated by the arrow A, the first protrusion 88a of one of the first cell voltage terminals 74a and the second protrusion 88b of the other of first cell voltage terminals 74a face each other, and contact each other through the insulating member 90. In the second cell voltage terminals 74b facing each other in the direction indicated by the arrow A, the first protrusion 88a of one of the second cell voltage terminals 74b and the second protrusion 88b of the other of second cell voltage terminals 74b face each other, and contact each other through the insulating member 90.

In the third cell voltage terminals 74c facing each other in the direction indicated by the arrow A, the first protrusion 88a of one of the third cell voltage terminals 74c and the second protrusion 88b of the other of third cell voltage terminals 74c face each other, and contact each other through the insulating member 90. In the fourth cell voltage terminals 74d facing each other in the direction indicated by the arrow A, the first protrusion 88a of one of the fourth cell voltage terminals 74d and the second protrusion 88b of the other of fourth cell voltage terminals 74d face each other, and contact each other through the insulating member 90.

That is, the insulating member 90 is provided between the first protrusion 88a and the second protrusion 88b that are adjacent to each other in the direction indicated by the arrow A. The insulating member 90 may be fixed to at least one of the protruding end surface of the first protrusion 88a of the cell voltage terminal 74 and the protruding end surface of the second protrusion 88b of the first cell voltage terminal 74a.

For example, a clip of a voltage detection apparatus is positioned between the first ridges 84a and the second ridges 84b of each of the cell voltage terminals 74. At this time, the clip is positioned between the two first protrusions 88a of each of the cell voltage terminals 74, and positioned between the two second protrusions 88b of each of the cell voltage terminals 74. Therefore, the first protrusions 88a and the second protrusions 88b do not interfere with the clip.

In each of the cell voltage terminals 74, the sizes, the shapes, the positions, and the numbers of the first ridges 84a and the second ridges 84b can be changed as necessary. Further, in each of the cell voltage terminals 74, the first ridges 84a and the second ridges 84b may be omitted. In each of the cell voltage terminals 74, the sizes, the shapes, the positions, and the numbers of the first ribs 86a and the second ribs 86b can be changed as necessary. Further, in each of the cell voltage terminals 74, the first ribs 86a and the second ribs 86b may be omitted. In each of the cell voltage terminals 74, the sizes, the shapes, the positions, and the numbers of the first protrusions 88a and the second protrusions 88b can be changed as necessary.

Next, operation of the fuel cell stack 10 having the above structure will be described below.

As shown in FIG. 2, the oxygen-containing gas flows into the oxygen-containing gas flow field 40 of the first separator 18 from the oxygen-containing gas supply passage 22a. The oxygen-containing gas flows along the oxygen-containing gas flow field 40 in the direction indicated by the arrow B, and the oxygen-containing gas is supplied to the cathode 34 of the MEA 28.

In the meanwhile, the fuel gas flows from the fuel gas supply passage 26a into the fuel gas flow field 54 of the second separator 20. The fuel gas flows along the fuel gas flow field 54 in the direction indicated by the arrow B, and the fuel gas is supplied into the anode 36 of the MEA 28.

Thus, in each of the MEAs 28, the oxygen-containing gas supplied to the cathode 34 and the fuel gas supplied to the anode 36 are partially consumed in electrochemical reactions to generate power generation.

Then, the oxygen-containing gas supplied to the cathode 34 is partially consumed at the cathode 34, and discharged along the oxygen-containing gas discharge passage 22b in the direction indicated by the arrow A. Likewise, the fuel gas supplied to the anode 36 is partially consumed at the anode 36, and discharged along the fuel gas discharge passage 26b in the direction indicated by the arrow A.

Further, after the coolant supplied to the coolant supply passage 24a flows into the coolant flow field 68 formed between the first separator 18 and the second separator 20, the coolant flows in the direction indicated by the arrow B. After the coolant cools the MEA 28, the coolant is discharged from the coolant discharge passage 24b.

The fuel cell stack 10 according to the embodiment of the present invention offers the following advantageous effects.

Each of the separator members 72 includes the separator body 38 stacked on the MEA 28, and the cell voltage terminal 74 protruding outward from the outer peripheral portion of the separator body 38. Each of the cell voltage terminals 74 includes the plate shaped terminal 83, the first protrusion 88a protruding from the terminal 83 (first terminal 80) toward one side in the stacking direction in which the MEA 28 and the separator body 38 are stacked together (in the direction indicated by the arrow A1), and the second protrusion 88b protruding from the terminal 83 (second terminal 82) toward the other side of in the stacking direction (direction indicated by the arrow A2).

At least some of the cell voltage terminals 74 (e.g., the plurality of first cell voltage terminal 74a) are arranged in a line in the stacking direction (direction indicated by the arrow A). In the cell voltage terminals 74 facing each other in the stacking direction, the first protrusion 88a of one of the cell voltage terminals 74 and the second protrusion 88b of the other of the cell voltage terminals 74 face each other, and contact each other through the electrically insulating member 90.

In the structure, in the cell voltage terminals 74 facing each other in the stacking direction, the first protrusion 88a of one of the cell voltage terminals 74 and the second protrusion 88b of the other of the cell voltage terminals 74 contact each other through the insulating member 90. Therefore, in the structure where the cell voltage terminals 74 face each other in the stacking direction, it is possible to support the cell voltage terminals 74 in the stacking direction. Thus, it is possible to suppress tilt of the cell voltage terminals 74 in the stacking direction.

The fuel cell stack 10 includes the plurality of first separator members 72a and the plurality of second separator members 72b as the separator members 72 sandwiching and holding the MEA 28. Each of the first separator members 72a includes the first cell voltage terminal 74a as the cell voltage terminal 74, and each of the second separator members 72b includes the second cell voltage terminal 74b as the cell voltage terminal 74.

Positions of the plurality of first cell voltage terminals 74a and the plurality of second cell voltage terminals 74b are shifted from each other in the width direction of the cell voltage terminal 74 as a direction perpendicular to a protruding direction in which the cell voltage terminal 74 protrudes from the separator body 38 and the stacking direction. The plurality of first cell voltage terminals 74a are arranged in a line in the stacking direction. In the first cell voltage terminals 74a which face each other in the stacking direction, the first protrusion 88a of one of the first cell voltage terminals 74a and the second protrusion 88b of the other of the first cell voltage terminals 74a contact each other through the insulating member 90. The plurality of second cell voltage terminals 74b are arranged in a line in the stacking direction, and in the second cell voltage terminals 74b which face each other in the stacking direction, the first protrusion 88a of one of the second cell voltage terminals 74b and the second protrusion 88b of the other of the second cell voltage terminals 74b contact each other through the insulating member 90.

In the structure, it is possible to relatively increase the distance between the terminals 83 of the first cell voltage terminals 74a which face each other. Further, it is possible to relatively increase the distance between the terminals 83 of the second cell voltage terminals 74b which face each other. In the structure, it is possible to easily attach a voltage detection apparatus (not shown) having a large width in the direction indicated by the arrow A to the first cell voltage terminal 74a and the second cell voltage terminal 74b.

As viewed in the stacking direction, the plurality of first cell voltage terminals 74a and the plurality of second cell voltage terminals 74b include the overlap portions 75a, 75b1 that are overlapped with each other, and the electrically insulating first terminal insulating portion 76a is provided between the overlap portion 75a of each of the first cell voltage terminals 74a and the overlap portion 75b1 of each of the second cell voltage terminals 74b.

In the structure, it is possible to prevent electrical connection between the first cell voltage terminal 74a and the second cell voltage terminal 74b by the first terminal insulating portion 76a.

The resin frame member 30 surrounding the MEA 28 is provided in the outer peripheral portion of the MEA 28, and the first terminal insulating portion 76a protrudes outward from outer peripheral portion of the resin frame member 30.

Thus, in the simple structure, it is possible to provide the first terminal insulating portion 76a.

The plurality of first protrusions 88a and the plurality of second protrusions 88b are provided in the terminal 83 in a manner to be spaced from each other in the width direction (direction indicated by the arrow B) of the cell voltage terminal 74.

In the structure, the plurality of first protrusions 88a and the plurality of second protrusions 88b can effectively suppress tilt of the cell voltage terminal 74 in the stacking direction (indicated by the arrow A).

The plurality of first protrusions 88a are positioned at both ends of one surface of the terminal 83 in the width direction, and the plurality of second protrusions 88b are positioned at both ends of the other surface of the terminal 83 in the width direction.

In the structure, the plurality of first protrusions 88a and the plurality of second protrusions 88b can effectively suppress tilt of the cell voltage terminal 74 in the stacking direction (indicated by the arrow A) to a greater extent.

Each of the first protrusion 88a and the second protrusion 88b extends in a protruding direction in which the cell voltage terminal 74 protrudes (in the direction indicated by the arrow B).

In the structure, the plurality of first protrusions 88a and the plurality of second protrusions 88b can effectively suppress tilt of the cell voltage terminals 74 in the stacking direction (direction indicated by the arrow A) to a greater extent.

Each of the cell voltage terminals 74 includes the first rib 86a protruding from the terminal 83 toward one side in the stacking direction and the second rib 86b protruding from the terminal 83 toward the other side in the stacking direction.

In the structure, the first rib 86a and the second rib 86b can improve the rigidity of the terminal 83. Thus, it is possible to suppress tilt of the cell voltage terminal 74 to a greater extent.

The protruding length of the first protrusion 88a is larger than the protruding length of the first rib 86a, and the protruding length of the second protrusion 88b is larger than the protruding length of the second rib 86b.

In the structure, it is possible to suppress direct contact between the first rib 86a and the second rib 86b facing the cell voltage terminal 74 in the staking direction (direction indicated by the arrow A), and the cell voltage terminals 74.

The present invention is not limited to the above described embodiments. Various modifications may be made without departing from the gist of the present invention.

The unit stack part 14a is not limited to have the above structure. The unit stack part 14a may be formed by stacking the first separator member 72a and the resin frame equipped MEA 16 together. The unit stack part 14a may be formed by stacking the first separator member 72a, the first resin frame equipped MEA 16a, the second separator member 72b, the first resin frame equipped MEA 16a together in this order. The unit stack part 14a may be formed by stacking the first separator member 72a, the first resin frame equipped MEA 16a, the second separator member 72b, the second resin frame equipped MEA 16b, the third separator 72c, and the fourth resin frame equipped MEA 16d together in this order. The numbers of the separator members 72 and the resin frame equipped MEAs 16 of the unit stack part 14a may be 5 or more, respectively.

The above embodiments can be summarized as follows:

The above embodiment discloses the fuel cell stack (10). The fuel cell stack includes the plurality of membrane electrode assemblies (28) and the plurality of separator members (72), the membrane electrode assemblies each including the electrolyte membrane (32), and the electrodes (34, 36) provided on both sides of the electrolyte membrane, the membrane electrode assemblies and the separator members being stacked together alternately, wherein each of the separator members includes the separator body (38) stacked on the membrane electrode assembly, and the cell voltage terminal (74) protruding outward from the outer peripheral portion of the separator body, the cell voltage terminal each includes the plate shaped terminal (83), the first protrusion (88a) protruding from the terminal toward one side in a stacking direction in which the membrane electrode assembly and the separator member are stacked together, and the second protrusion (88b) protruding from the terminal toward the other side of in the stacking direction, and wherein at least some of the cell voltage terminals are arranged in a line in the stacking direction, and in the cell voltage terminals facing each other in the stacking direction, the first protrusion of one of the cell voltage terminals and the second protrusion of the other of cell voltage terminals face each other, and contact each other through the electrically insulating member (90).

In the fuel cell stack, the fuel cell stack may include the plurality of first separator members (72a) and the plurality of second separator members (72b) as the separator members sandwiching and holding the membrane electrode assembly, each of the first separator members may include the first cell voltage terminal (74a) as the cell voltage terminal, and each of the second separator members may include the second cell voltage terminal (74b) as the cell voltage terminal, positions of the plurality of first cell voltage terminals and the plurality of second cell voltage terminals may be shifted from each other in the width direction of the cell voltage terminal as a direction perpendicular to a protruding direction in which the cell voltage terminal protrudes from the separator body and the stacking direction, the plurality of first cell voltage terminals may be arranged in a line in the stacking direction, in the first cell voltage terminals which face each other in the stacking direction, the first protrusion of one of the first cell voltage terminals and the second protrusion of the other of the first cell voltage terminals may face each other, and contact each other through the insulating member, the plurality of the second cell voltage terminals may be arranged in a line in the stacking direction, and in the second cell voltage terminals which face each other in the stacking direction, the first protrusion of one of the second cell voltage terminals and the second protrusion of the other of the second cell voltage terminals may face each other, and contact each other through the insulating member.

In the fuel cell stack, as viewed in the stacking direction, the plurality of first cell voltage terminals and the plurality of second cell voltage terminals may include overlap portions (75a, 75b1) that are overlapped with each other, and electrically insulating terminal insulating portion (76a) may be provided between the overlap portion of each of the first cell voltage terminals and the overlap portion of each of the second cell voltage terminals.

In the fuel cell stack, the resin frame member (30) surrounding the membrane electrode assembly may be provided in the outer peripheral portion of the membrane electrode assembly, and the terminal insulating portion may protrude outward from the outer peripheral portion of the resin frame.

In the fuel cell stack, the terminal insulating portion may protrude outward beyond the first cell voltage terminal and the second cell voltage terminal.

In the fuel cell stack, the first protrusion may include a plurality of first protrusions and the second protrusion may include a plurality of second protrusions, and the plurality of first protrusions and the plurality of second protrusions are provided in the terminal in a manner to be spaced from each other in the width direction of the cell terminal which is a direction perpendicular to a protruding direction in which the cell voltage terminal protrudes from the separator body and the stacking direction.

In the fuel cell stack, the plurality of first protrusions may be positioned at both ends of one surface of the terminal in the width direction, and the plurality of second protrusions may be positioned at both ends of the other surface of the terminal in the width direction.

In the fuel cell stack, each of the first protrusion and the second protrusion may extend in a protruding direction in which the cell voltage terminal protrudes.

In the fuel cell stack, each of the cell voltage terminals may include the first rib (86a) protruding from the terminal toward one side in the stacking direction, and the second rib (86b) protruding from the terminal toward the other side in the stacking direction.

In the fuel cell stack, the protruding length of the first protrusion may be larger than the protruding length of the first rib, and the protruding length of the second protrusion may be larger than the protruding length of the second rib.

What is claimed is:

1. A fuel cell stack comprising a plurality of membrane electrode assemblies and a plurality of separator members, the membrane electrode assemblies each including an electrolyte membrane, and electrodes provided on both sides of the electrolyte membrane, the membrane electrode assemblies and the separator members being stacked together alternately,
    wherein each of the separator members includes:
    a separator body stacked on the membrane electrode assembly; and
    a cell voltage terminal protruding outward from an outer peripheral portion of the separator body,
    the cell voltage terminal each comprises:
    a plate shaped terminal;
    a first protrusion protruding from the terminal toward one side in a stacking direction in which the membrane electrode assembly and the separator member are stacked together; and
    a second protrusion protruding from the terminal toward another side of in the stacking direction,
    and wherein at least some of the cell voltage terminals are arranged in a line in the stacking direction; and
    in the cell voltage terminals facing each other in the stacking direction, the first protrusion of one of the cell voltage terminals and the second protrusion of another of the cell voltage terminals face each other, and contact each other through an electrically insulating member.

2. The fuel cell stack according to claim 1, wherein the fuel cell stack comprises a plurality of first separator members and a plurality of second separator members as the separator members sandwiching and holding the membrane electrode assembly,
    each of the first separator members includes a first cell voltage terminal as the cell voltage terminal,
    each of the second separator member includes a second cell voltage terminal as the cell voltage terminal,
    positions of the plurality of first cell voltage terminals and the plurality of second cell voltage terminals are shifted from each other in a width direction of the cell voltage terminal as a direction perpendicular to a protruding direction in which the cell voltage terminal protrudes from the separator body and the stacking direction,
    the plurality of first cell voltage terminals are arranged in a line in the stacking direction,
    in the first cell voltage terminals which face each other in the stacking direction, a first protrusion of one of the first cell voltage terminals and the second protrusion of another of the first cell voltage terminals face each other, and contact each other through the insulating member,
    a plurality of the second cell voltage terminals are arranged in a line in the stacking direction, and
    in the second cell voltage terminals which face each other in the stacking direction, a first protrusion of one of the second cell voltage terminals and the second protrusion of another of the second cell voltage terminals face each other, and contact each other through the insulating member.

3. The fuel cell stack according to claim 2, wherein, as viewed in the stacking direction, the plurality of first cell voltage terminals and the plurality of second cell voltage terminals include overlap portions that are overlapped with each other, and
    an electrically insulating terminal insulating portion is provided between the overlap portion of each of the first cell voltage terminals and the overlap portion of each of the second cell voltage terminals.

4. The fuel cell stack according to claim 3, wherein a resin frame member surrounding the membrane electrode assembly is provided in an outer peripheral portion of the membrane electrode assembly, and
    the terminal insulating portion protrudes outward from an outer peripheral portion of the resin frame.

5. The fuel cell stack according to claim 4, wherein the terminal insulating portion protrudes outward beyond the first cell voltage terminal and the second cell voltage terminal.

6. The fuel cell stack according to claim 1, wherein the first protrusion comprises a plurality of first protrusions and the second protrusion comprises a plurality of second protrusions, and the plurality of first protrusions and the plurality of second protrusions are provided in the terminal in a manner to be spaced from each other in a width direction of the cell terminal which is a direction perpendicular to a protruding direction in which the cell voltage terminal protrudes from the separator body and the stacking direction.

7. The fuel cell stack according to claim 6, wherein the plurality of first protrusions are positioned at both ends of one surface of the terminal in the width direction, and
    the plurality of second protrusions are positioned at both ends of another surface of the terminal in the width direction.

8. The fuel cell stack according to claim 1, wherein each of the first protrusion and the second protrusion extends in a protruding direction in which the cell voltage terminal protrudes.

9. The fuel cell stack according to claim 1, wherein each of the cell voltage terminals includes:
    a first rib protruding from the terminal toward one side in the stacking direction; and
    a second rib protruding from the terminal toward another side in the stacking direction.

10. The fuel cell stack according to claim 9, wherein a protruding length of the first protrusion is larger than a protruding length of the first rib, and
    a protruding length of the second protrusion is larger than a protruding length of the second rib.

* * * * *